US008060910B2

(12) United States Patent
Cruz et al.

(10) Patent No.: US 8,060,910 B2
(45) Date of Patent: Nov. 15, 2011

(54) SET TOP BOX APPARATUS HAVING A RADIO FREQUENCY ANTENNA AND AN ASSOCIATED METHOD

(75) Inventors: Anthony Cruz, Port Deposit, MD (US); Laszlo Erdely, Jr., Crofton, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 481 days.

(21) Appl. No.: 11/614,855

(22) Filed: Dec. 21, 2006

(65) Prior Publication Data
US 2008/0155636 A1 Jun. 26, 2008

(51) Int. Cl.
*H04N 7/173* (2011.01)
(52) U.S. Cl. .......................... 725/100; 725/131; 725/151
(58) Field of Classification Search .................. 725/100, 725/131, 151
See application file for complete search history.

(56) References Cited

U.S. PATENT DOCUMENTS

| | | | | |
|---|---|---|---|---|
| 5,936,660 | A * | 8/1999 | Gurantz | 725/71 |
| 5,990,927 | A * | 11/1999 | Hendricks et al. | 725/132 |
| 6,529,233 | B1 * | 3/2003 | Allen | 348/211.2 |
| 6,606,747 | B1 * | 8/2003 | Yuen et al. | 725/40 |
| 6,647,015 | B2 * | 11/2003 | Malkemes et al. | 370/401 |
| 6,681,638 | B2 * | 1/2004 | Kazerooni et al. | 73/760 |
| 6,766,526 | B1 * | 7/2004 | Ellis | 725/57 |
| 6,865,746 | B1 * | 3/2005 | Herrington et al. | 725/53 |
| 7,373,650 | B1 * | 5/2008 | Rodriguez et al. | 725/41 |
| 7,725,912 | B2 * | 5/2010 | Margulis | 725/81 |
| 2003/0014765 | A1 * | 1/2003 | Ljungdahl et al. | 725/126 |
| 2003/0097662 | A1 * | 5/2003 | Russ et al. | 725/117 |
| 2003/0154492 | A1 * | 8/2003 | Falvo et al. | 725/113 |
| 2004/0068747 | A1 * | 4/2004 | Robertson et al. | 725/98 |
| 2004/0068754 | A1 * | 4/2004 | Russ | 725/131 |
| 2004/0117831 | A1 * | 6/2004 | Ellis et al. | 725/53 |
| 2004/0181814 | A1 * | 9/2004 | Ellis et al. | 725/134 |
| 2005/0005297 | A1 | 1/2005 | Lee | |
| 2005/0009539 | A1 * | 1/2005 | Yassa | 455/456.6 |
| 2006/0184976 | A1 * | 8/2006 | Lee et al. | 725/81 |
| 2006/0288387 | A1 * | 12/2006 | Asai | 725/78 |
| 2007/0033630 | A1 * | 2/2007 | Reznik et al. | 725/131 |
| 2007/0082637 | A1 * | 4/2007 | Nam | 455/189.1 |
| 2007/0101380 | A1 * | 5/2007 | Szolyga | 725/100 |
| 2007/0101395 | A1 * | 5/2007 | Cha | 725/134 |
| 2007/0143806 | A1 * | 6/2007 | Pan | 725/111 |
| 2008/0055190 | A1 * | 3/2008 | Lee | 345/2.1 |

* cited by examiner

*Primary Examiner* — Pankaj Kumar
*Assistant Examiner* — Mulugeta Mengesha

(57) ABSTRACT

Systems, methods and devices are provided for enabling a wireless television network at a subscriber location in a subscriber television network, such as a cable or satellite television network. In general, a set top box apparatus is provided having a receiver configured to receive a media content signal from the television network, the media content signal being composed of a plurality of channels. The set top box comprises a plurality of tuners for tuning to various channels available in the media content signal. At least a first tuner of the plurality of tuners is operatively coupled to a radio frequency transmitter of the set top box. The radio frequency transmitter is configured to utilize an antenna to communicate a radio frequency signal for wirelessly communicating media content received by the first tuner to at least one remote television. In an embodiment, the set top box further includes at least one radio frequency remote control for controlling the tuning of the first tuner.

20 Claims, 3 Drawing Sheets

SET TOP BOX APPARATUS HAVING A RADIO FREQUENCY ANTENNA AND AN ASSOCIATED METHOD

BRIEF DESCRIPTION OF THE SEVERAL VIEWS OF THE DRAWING(S)

DETAILED DESCRIPTION

Exemplary embodiments now will be described hereinafter with reference to the accompanying drawings, in which exemplary embodiments and examples are shown. Like numbers refer to like elements throughout.

Figure 1:
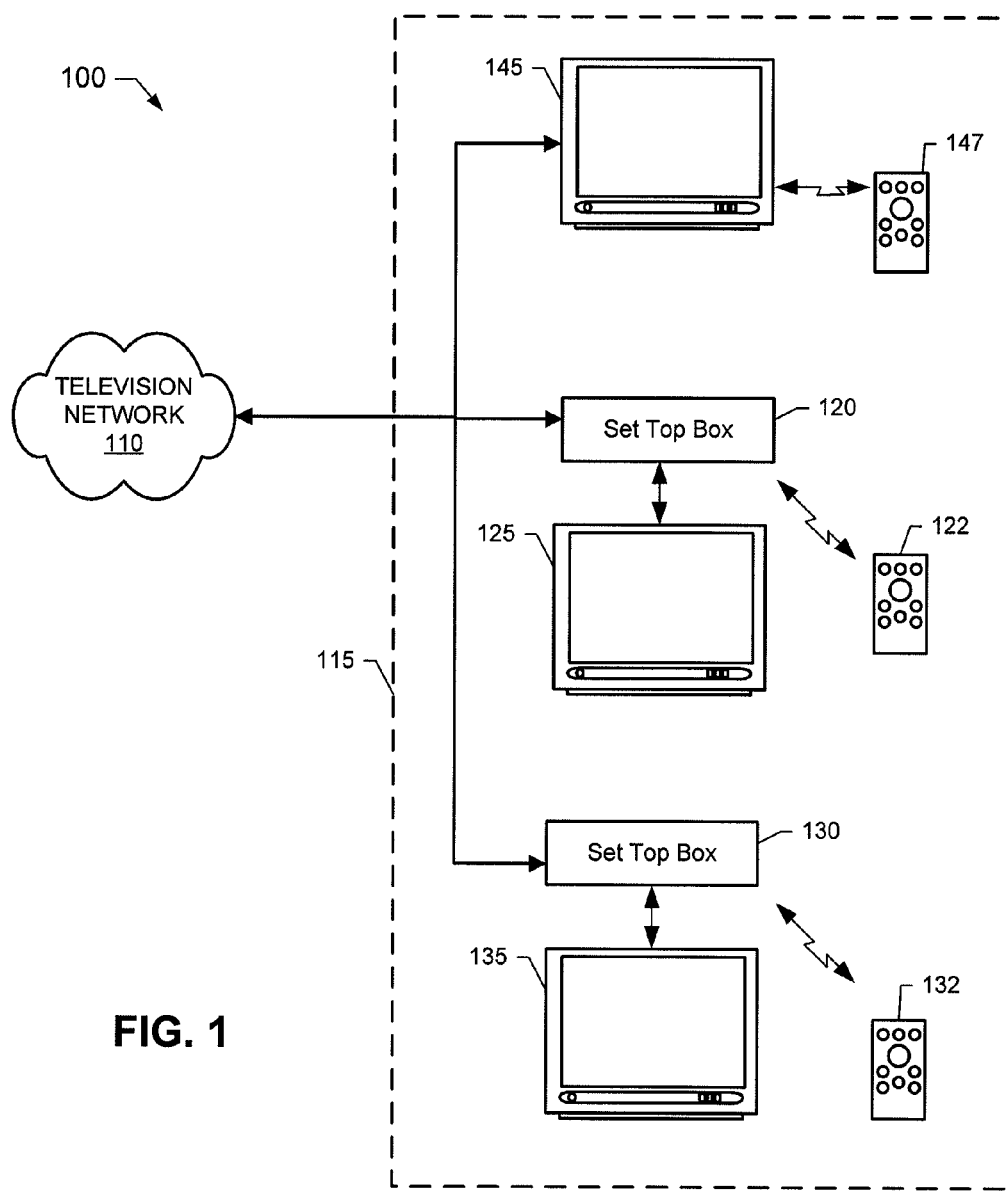
FIG. 1 is a schematic illustration of the subscriber end of an exemplary cable or satellite system.

FIG. 1 illustrates a subscriber's end 100 of an exemplary subscriber television network, such as a cable or satellite television network. The subscriber's residence 115 is connected to the television network 110 so that the subscriber can receive media content from the television network 110 and display the content on one or more television sets (TVs), such as the three illustrated TVs 125, 135, and 145. In general, a coaxial ("coax") cable is used to carry television signals throughout the subscriber's residence 115, from one room of the residence to another. Typically, a set top box (STB) 120 is required in order to unscramble or decrypt the media content and/or to decode digital media content. The STB 120 is also typically necessary to allow the subscriber to communicate information and requests to the service provider over the television network 110 as well as to provide the subscriber access to premium features that the service provider may offer. The exemplary STB 120 has a first cable interface for receiving a cable that connects the STB 120 to the television network 110 and a second cable interface for receiving a cable that connects the STB 120 to a single TV 125. The STB 120 typically includes an infrared radiation (IR) remote control for controlling the features and functions of the STB 120.

If the subscriber desires to have more than one TV connected to the television network 110 and the subscriber desires to place these additional TVs at other locations in the subscriber's residence 115, the subscriber must route coax cable though the walls, attic or crawl space of the house or around the rooms of the house so as to have cable at the desired locations. Routing cable around the rooms of a residence is generally unattractive and wiring cable through the walls, attic or crawl space can be time consuming and expensive if the walls are already finished. The problems associated with routing wires are further exacerbated by the popularity of flat screen TVs designed to be hung on a wall. It is rare that a subscriber will already have cable wired to exactly the correct point on the wall where the subscriber desires to place the TV. Furthermore, even if the subscriber does route wires to the appropriate locations, the subscriber does not have the flexibility to easily move the TV to a new location.

Even if the subscriber does have the wiring in place at the correct locations, the subscriber may need to have a different STB for each TV, for example as illustrated in FIG. 1 by STB 130 and TV 135. Since, as described above, the media content is often scrambled, encrypted, and/or encoded, the STB is usually required to receive the media content, especially digital content. Additional STBs may be costly since the STBs are often expensive electronic devices that are provided by the service provider for a fee. In some cases, a TV, such as TV 145, may be "cable ready" and capable of receiving, without the use of a STB, any unscrambled analog television channels that may be communicated over the television network 110. Such a TV, however, will not be able to receive digital-quality media content, scrambled/encrypted/encoded media content, or any of the premium features provided by the service provider, such as pay-per-view service, video-on-demand service, interactive programming guide services, and the like.

Thus, in the exemplary system of FIG. 1, the subscriber runs into problems when the subscriber desires to put a TV in a location where there is no coax cable readily available. Furthermore, even if cable is available, the subscriber may need to pay for additional STBs in order to access the network with additional TVs or may not be able to receive the premium features or functions that may be available to a TV connected to the network via a STB.

Figure 2:
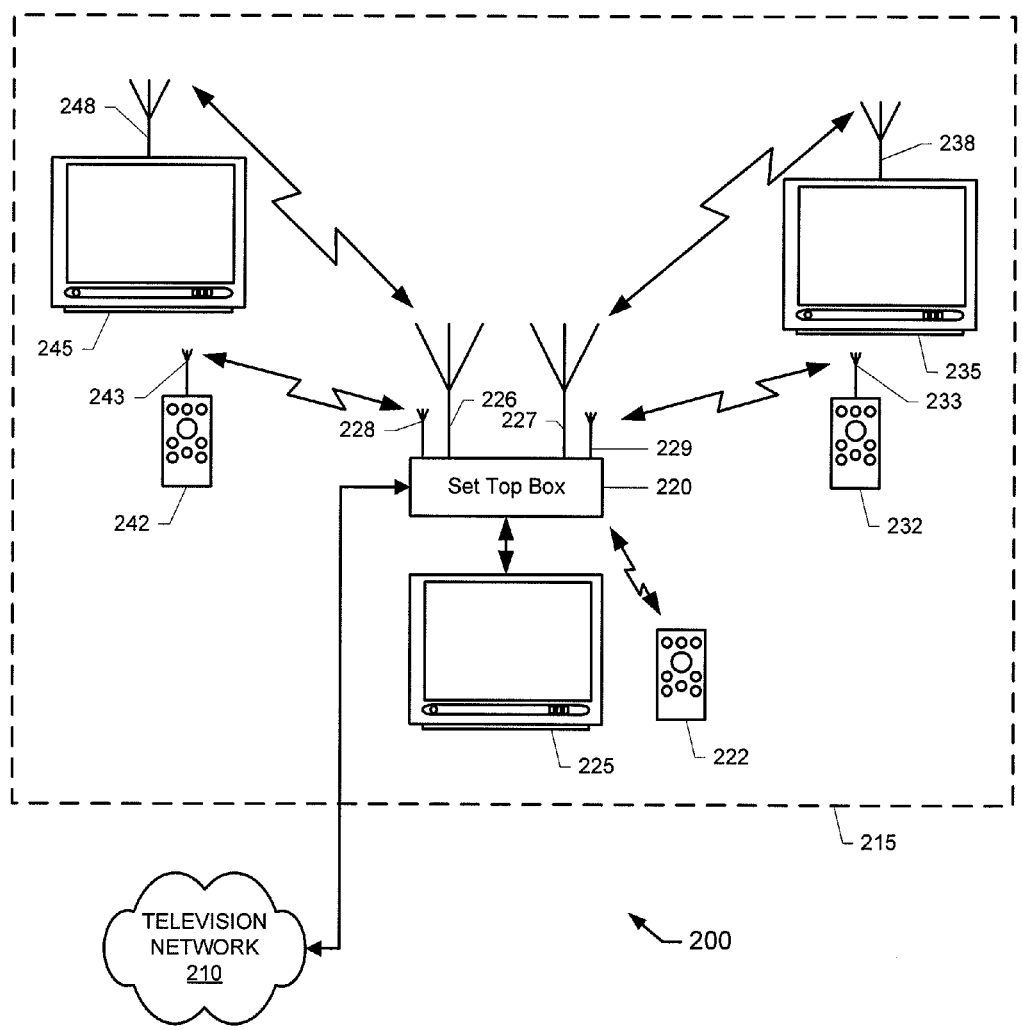
FIG. 2 is a schematic illustration of a the subscriber end of a cable or satellite system having a multiple tuner wireless set top box, in accordance with an embodiment.

FIG. 2 is a schematic illustration of a subscriber's end 200 of a subscriber television system utilizing an embodiment of a multiple tuner wireless set top box (STB) 220. In particular, in the illustrated embodiment the multiple tuner wireless STB 220 is being used to provide television signals to at least three TVs 225, 235, and 245. In this regard, the STB 220 is operatively coupled to a television network 210. In general, the STB 220 may be connected to the television network 210 via a wired connection, such as by a coax or fiber optic cable, although the STB may be connected to the television network 210 via other means. The STB 220 is configured to receive a media content signal, such as an audio and/or video signal, from the television network 210. In general, the media content signal comprises media content for a plurality of different channels.

The STB 220 includes a plurality of tuners (not shown), each tuner configured to receive and decode, if necessary, one of the plurality of channels in the received media content signal. At least one of the plurality of tuners is coupled to a radio frequency (RF) antenna. In the illustrated embodiment, the STB 220 includes at least three tuners. A first tuner is operatively coupled to a first RF antenna 227 and is configured to wirelessly communicate the media content received and/or decoded by the first tuner to an antenna 238 of a first TV 235. A second tuner is operatively coupled to a second RF antenna 226 and is configured to wirelessly communicate the media content received and/or decoded from the second tuner to an antenna 248 of a second TV 245. A third tuner is operatively coupled to a cable interface (not shown) of the STB 220 so that media content received and/or decoded from the third tuner may be communicated to a third TV 225 via a wired connection. Although the embodiment illustrated by FIGS. 2 and 3 has three tuners, two of which are coupled to RF antennas, other embodiments may have less than three tuners or more than three tuners. Furthermore, in an embodiment, all of the tuners may be coupled to one or more RF antennas and the STB may not support any wired connections to a TV. In other embodiments, each tuner may be coupled to both a cable interface for enabling a wired connection to a TV as well as a RF antenna for enabling a wireless connection to a TV. In such an embodiment, the user may use both the wired and wireless connections or choose to use either the wired or the wireless connection for each tuner depending on the user's needs. Moreover, although FIG. 2 illustrates a first antenna and a second RF antenna coupled to the first tuner and the second tuner, respectively, in other embodiments two or more of the tuners are operatively coupled to a single RF antenna to enable wireless communication of media content from the tuners to one or more TVs.

As described in more detail below, in an embodiment, the STB 220 is configured to use the one or more antennas 227 and 226 to communicate wireless media content to the TVs 245 and 235 over a frequency that a standard TV is configured to recognize using a standard dipole antenna. In this regard, the STB 220 may receive media content from the television network 210 using a tuner in the STB 220 and then broadcast the media content wirelessly in a frequency range of the RF spectrum that corresponds to a standard television broadcast channel. For example, in an embodiment, the STB 220 may be configured to convert the media content received at a first tuner of the STB 220 into a RF signal communicated by the first antenna 227 in the frequency range of 60 to 66 megahertz (MHz). This frequency range corresponds to channel 3 in the National Television System Committee (NTSC) standard adopted by the Federal Communications Commission (FCC). As such, when the first TV 235 (assuming that the first TV 235 is configured in accordance with the NTSC standard) is tuned to channel 3, the antenna 238 of the first TV 235 will receive the media content from the first tuner of the STB 220 via the first antenna 227 of the STB 220. It is noted that although the first TV 235 is tuned to channel 3, the media content received and displayed by the first TV 235 need not be the media content from the channel designated as channel 3 from among the plurality of channels received by the STB 220. Instead, the media content received and displayed by the first TV 235 will be the media content for the channel received and/or decoded by the respective tuner. Although a signal may be broadcast from a television station over the same channel as the STB's antenna, when the TV 235 is within a certain range of the STB 220, the TV 235 will receive the signal broadcast from the STB 220 over the signal broadcast from any remote television station. In an embodiment, however, the STB 220 may be configured to communicate via the antenna 227 using an unused frequency.

Where the STB 220 comprises a second tuner coupled to a second antenna 226, as in the illustrated embodiment of FIG. 2, the STB 220 may be configured to use the second antenna 226 to communicate media content received by the second tuner using a frequency different from the frequency used to communicate signals from the first antenna 227. For example, in the embodiment described above where the first antenna 227 is used to broadcast a signal in the 60-66 MHz frequency range (NTSC channel 3), the second antenna 226 may be used to communicate in the 66-72 MHz frequency range, corresponding to channel 4 in the NTSC standard. Thus, in such an embodiment, the second TV 245 may be tuned to channel 4 in order to receive media content from the second tuner in the STB 220. Moreover, depending upon their reception, one or both of the first and second TVs may receive signals from both the first and second antennas 227 and 226 such that, in this exemplary embodiment, the TV will display the media content from the first tuner in instances in which the TV is tuned to channel 3 and will display the media content from the second tuner in instances in which the TV is tuned to channel 4.

As illustrated also in FIG. 2, the STB 220 may further comprise a plurality of remote controls for controlling the plurality of tuners in the STB 220. In this regard, in the illustrated embodiment, the STB 220 includes three remote controls, including a first remote control 232, a second remote control 242, and a third remote control 222. The first remote control 232 may be configured to control the first tuner of the STB 220. As such, where a user has the antenna 238 of the first TV 235 tuned to the frequency output by the first antenna 227 of the STB 220, the user can use the first remote control 232 to control what channel of the media signal received from the television network 210 is displayed on the first TV 238 by controlling which channel of the media signal the first tuner receives and/or decodes. Likewise, the second and third remote controls 242 and 222 may be configured to control the second and third tuners, respectively, and, thus, may be used by the users of the second and third TVs 245 and 225, respectively, to control what is being viewed on the respective TV.

In the illustrated embodiment, the first and second remote controls 232 and 242 are each RF remote controls comprising RF antennas 233 and 243 for broadcasting RF signals to the STB 220. The STB 220 may comprise first and second RF antennas 229 and 228 for receiving the RF signals from the first and second remote controls 232 and 242, respectively. The first and second RF antennas 229 and 228 may be operatively coupled to the first and second tuners, respectively, via one or more processing elements so as to allow each remote control to control the respective tuner and/or other functions of the STB 220. Although FIG. 2 illustrates first and second RF antennas 229 and 228 for receiving signals from the first and second remote controls 232 and 242, respectively, in other embodiments the STB may have a single RF antenna for communicating with a plurality of RF remote controls. Likewise, in some embodiments, the same antenna that is used to communicate media content to one or more TVs may also be used to receive RF signals from one or more of the RF remote controls.

In contrast to a traditional infrared radiation (IR) remote control, the RF remote control does not require a direct line of site with an IR sensor on the STB 220. Since the first and second TVs 235 and 245 illustrated in FIG. 2 may likely be placed in different rooms of a subscriber's home, the RF remote may allow the user to communicate commands to the STB 220 when viewing these TVs in other rooms where there may be no clear direct line of site to the STB 220. In some embodiments, such as, for example, where the STB 220 includes one or more output jacks for connecting to a TV via a wired connection, the STB may also include an IR sensor and an IR remote control for controlling the one or more tuners coupled to the output jack. In this regard, in the embodiment illustrated in FIG. 2, the third remote control 222 may be an IR remote control. Of course, in some embodiments, all of the remote controls may be RF remote controls or other types of remote controls, such as IR remote controls, regardless of whether the one or more tuners associated with the remote control is coupled to a wired or wireless transceiver.

Figure 3:
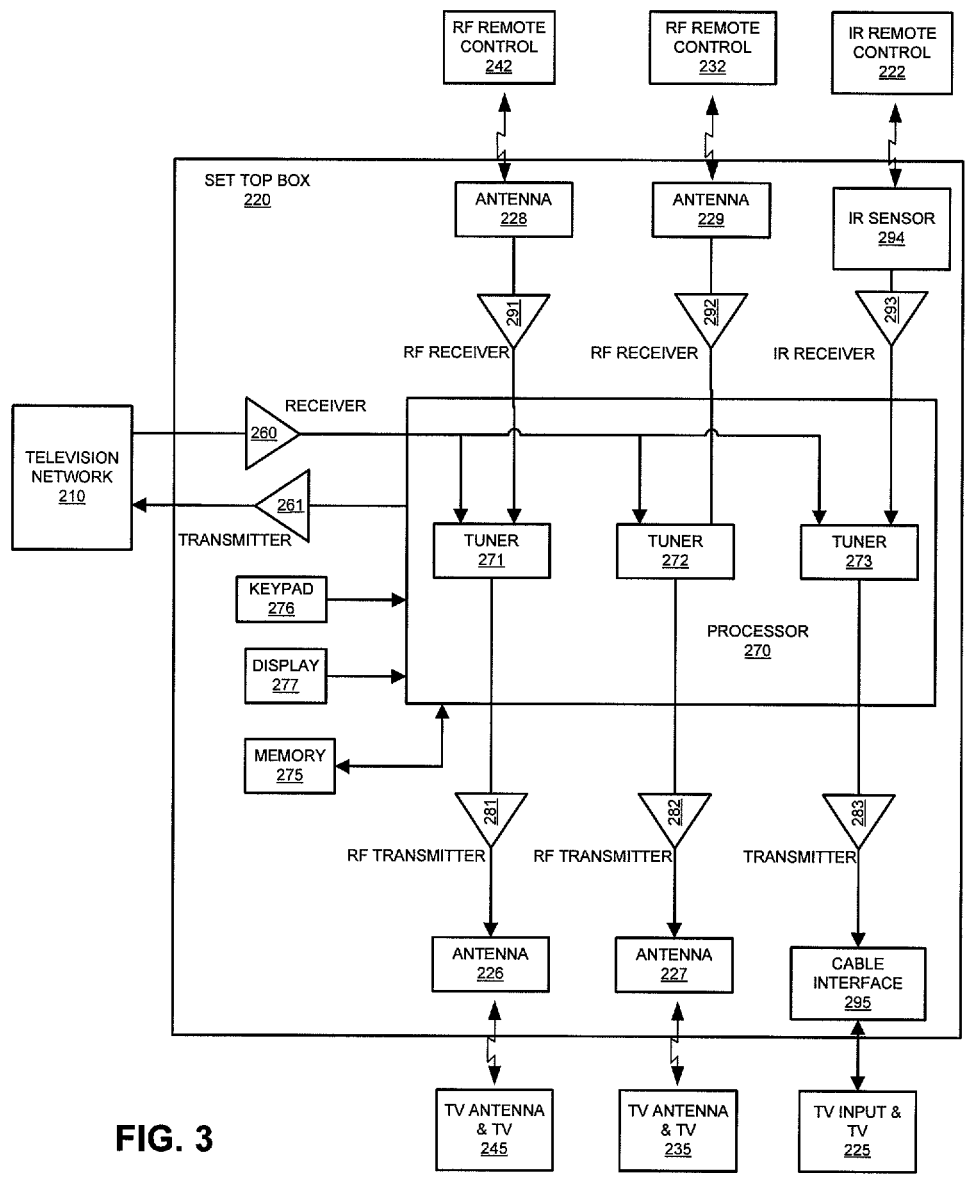
FIG. 3 is a schematic block diagram illustrating an embodiment of a multiple tuner wireless set top box.

FIG. 3 illustrates a schematic block diagram of an embodiment of the subscriber end of a subscriber television network and, in particular, a schematic block diagram of an embodiment of STB 220. As illustrated, the STB 220 is operatively connected to the television network 210 and receives media content therefrom. The television network 210 may include a cable television network, a satellite television network such as a direct broadcast digital satellite network, a combination cable and satellite television network, or some other network capable of delivering television programs and other media content to a subscriber location, such as a subscriber's home or business.

In one exemplary embodiment, the television network 210 comprises a conventional cable television network in which one or more content providers communicate media content to one or more headends. From the headends, the media content may be communicated over a communications network that includes fiber optic and/or coax cable networks. The communications network may comprise a plurality of nodes, each of which may serve a local geographical area, such as a neighborhood. Each node may be connected to a plurality of taps, such as one tap for each subscriber location. A tap may be connected to one or more STBs 220 located at the subscriber location, such as the subscriber's home. The STB 220 may be connected to a tap by a coax or fiber optic cable and may receive media content signals over such cable.

In this regard, the STB 220 comprises a receiver 260 for receiving media content signals from the television network 210 and communicating the media content signals to a processor 270, which may comprise one or more signal processing elements, such as a microprocessor, an application specific integrated circuit (ASIC) or other computing device, for processing the media content signal. In an embodiment, the STB 220 may be a bi-directional STB 220 and may also have a transmitter 261 for transmitting data from the processor 270 of the STB 220 to a service provider (not shown) located on the television network 210. For example, with such a bi-directional STB 220, in addition to receiving media content signals, a subscriber may be able to transmit messages to the service provider in order to select, for example, premium service options such as pay-per-view and video-on-demand services.

In general, the media content signal received by the receiver 260 comprises a plurality of channels in digital and/or analog form, each channel at a different frequency in the media content signal. For example, the frequencies in the range of approximately 5-42 MHz are known as "upstream" signals, and the frequencies in the range of approximately 54-860 MHz are known as "downstream" signals. From the perspective of the STB 220, an upstream signal is transmitted and a downstream signal is received. Within the downstream range, the frequencies from approximately 88-130 MHz are known as "out-of-band downstream." The out-of-band downstream range is used by the set-top box for receiving service information (e.g., electronic programming guide information) and for receiving the scramble key used by the STB 220 to descramble a scrambled broadcast digital signal. The "in-band" downstream range is used by the STB 220 for receiving audio and video content in the form of a plurality of channels at various frequencies depending on the frequency standard used. Current broadcast systems typically need to support both analog and digital television. As such, the in-band downstream range is typically used for carrying both analog and digital audio and video content.

As described above the media content signal received by the receiver 260 may be sent to the processor 270. The processor 270 may comprise a plurality of tuners, such as tuners 271, 272, and 273. The tuners may be configured to tune to a particular channel by tuning to a particular frequency in the downstream range of the received media content signal. In this regard, the tuners may comprise one or more demultiplexers and/or demodulators. Often, the service providers broadcast a scrambled or encrypted media signal to prevent unauthorized use. If such is the case, the tuner or other processing apparatus may further include a descrambler and/or decrypter configured to descramble and/or decrypt the signal using a key provided by the service provider. In an embodiment, information and instructions associated with receiving and processing media content signals, such as the scramble or encryption key, are stored in a memory 275 of the STB 220 and accessible and/or executed by the processor 270.

Digital signals are typically received by the STB 220 in a compressed or otherwise encoded data format such as the MPEG-2 (Moving Picture Experts Group) format for video signals and/or the Dolby AC3 format for audio signals. As such, the tuners may also comprise one or more decoders configured to decode (uncompress) the media content.

After the tuner receives the media content for a particular channel by processing the signal as described above, media content may be further processed by a transmitter so that it can be viewed and/or listened to by the subscriber using, for example, a television set. In the illustrated embodiment, the STB 220 comprises three transmitters including a first transmitter 281, a second transmitter 282, and a third transmitter 283.

The first and second transmitters 281 and 282 are RF transmitters and are operatively coupled to first and second RF antennas 226 and 227, respectively. The RF transmitters 281 and 282 are each configured to receive streaming media content from the respective tuner and use the respective antenna to transmit the media content wirelessly using a radio frequency (RF) signal, such as a RF signal in the VHF or UHF band of the RF spectrum. As described above, in an embodiment, the RF transmitters and antennas are configured to transmit media content to one or more TVs using a frequency range for a particular broadcast channel as defined by a television frequency standard, such as the NTSC standard. For example, in an embodiment, each RF transmitter is configured to use the corresponding antenna to transmit media content received from a tuner at a frequency allotted to one of the six channels in the frequency range of 54-88 MHz. In an embodiment, the user may select the frequency/channel at which each transmitter and antenna transmits the media content.

The RF signals communicated by the first and second antennas 226 and 227 are received by the antennas and the tuners of the first and second TVs 245 and 235, respectively. Where the STB 220 is configured to transmit wireless RF signals at the particular frequencies allotted to particular channels by a television frequency standard, a user having a television compliant with that standard may be able to receive the signal from the STB 220 using only a standard dipole antenna that typically comes with the TV and by tuning the TV to the same channel at which the STB 220 is transmitting. As described above, where the STB comprises more than one tuner coupled to an RF transmitter and antenna, each of the two or more transmitters and antennas may be configured to transmit at frequencies allotted for different channels so that different TVs can display media content from different tuners. In some embodiments, the antenna on the TV may comprise a signal amplifier and/or reflector for improving the strength of the signal and/or the useable range of the signal transmitted by the STB 220.

As described above with reference to FIG. 2, the illustrated embodiment of the STB 220 comprises a third tuner 273 coupled to a third transmitter 283 that is configured to transmit media content to a TV 225 via a cable interface 295 and a wired connection. A variety transmission systems, cables, and interfaces, such as those known in the art, may be used for communicating signals from the STB 220 to a TV 225 over a wired connection. For example, in an embodiment, the transmitter is configured to modulate the media content received from the third tuner 273 to a channel 3 or 4 frequency which is then communicated to the TV using a coax cable. In other embodiments, the connection may utilize such connectors as composite video, S-video, component video, VGA, DVI (Digital Visual Interface), HDMI, IEEE 1394 ("firewire"), and the like.

As also described above with respect to FIG. 2, the STB 220 may include a plurality of remote control devices, such as a first remote control 242, a second remote control 232, and a third remote control 222. In general, embodiments of the STB 220 may comprise at least one remote control for each tuner in the STB 220. However, in some embodiments, there may be more tuners than remote controls and/or the remote controls may have the option of controlling other tuners. For example, in an embodiment, a user viewing a TV utilizing a first tuner of the STB 220 may be able to use the remote control configured for controlling the first tuner in order to command the STB 220 to utilize a second tuner for recording media content to memory 275 in the STB 220.

In the illustrated embodiment, the first and second remote controls 242 and 232 are RF remote controls configured to communicate with the processor 270 of the STB 220 via antennas 228 and 229, respectively. RF signals received by the antennas 228 and 229 are received by the RF receivers 291 and 292, respectively, and are processed by the processor 270. The processor 270 may demodulate the signal and interpret the signal using, for example, a key stored in memory 275. The processor 270 may then control the respective tuner 271 or 272 or perform other functions based on the signal received from the remote controls 242 and 232.

In the illustrated embodiment, the third remote control 222 is an IR remote control. As such, the STB 220 may comprise an IR sensor 294 and an IR receiver 293 for receiving IR signals from the IR remote control 222 and communicating these signals to the processor for processing. In other embodiments, all of the remote controls associated with the STB 220 may be RF remote controls or other types of remote controls.

As described above, a remote control may be used to change the channel of the media content signal to which a tuner is tuning. In an embodiment, a signal communicated from a remote control to the processor 270 may include an indication as to which tuner that the remote control is intending to control, and such a signal may, in an embodiment, be changed by the user of the remote control. In other embodiments, the processor 270 may distinguish between the various remote controls by a unique identifier, such as a unique signaling frequency, associated with each remote control or by the particular antenna and/or receiver at the STB 220 that receives the signal from the remote control.

In addition to controlling one or more of the tuners, the remote controls may also be used to control other functions of the STB 220. Such other functions may include, for example, requesting pay-per-view or video-on-demand programs, pausing, stopping, rewinding, and/or fast forwarding a program, recording media content to memory 275, scheduling media content to be recorded to memory 275, retrieving media content from the memory 275, calling up an interactive media guide, selecting a program from an interactive media guide, initiating picture-in-picture, etc. In an embodiment, one or more of these functions may be available to any tuner and/or may be commanded by any remote control of the STB 220.

Although not shown in FIG. 3, in an embodiment, the STB 220 may support two-way communication with one or more of the remote controls. In this regard, the STB 220 may include one or more transmitters (not shown) coupled to the processor 270 and to one or more of the antennas 228, 229, and 294 for transmitting RF, IR, or other signals to one or more remote controls, thereby enabling communication from the processor to the remote control. In this regard, in an embodiment, the processor may be configured to communicate information such as advertising information or program guide information to a display on the remote control, if the remote control includes a display.

In addition to the features and components described above, the STB 220 may include other features and components, such as those features and components currently found on set top boxes, digital video recorders (DVRs), and the like. For example, the STB 220 may include a display 277 for presenting information to a user such as the current time, the current channel of one or more of the tuners, indicators as to whether or not the set top box is on, whether other tuners are being utilized, or whether the STB 220 is recording. Furthermore, the STB 220 may include a keypad 276 as another mode of supplying user input in addition to or as an alternative to the remote controls. The key pad 276 may include one or more buttons to allow a user to communicate information and commands to the processor 270.

Although FIG. 3 illustrate a separate RF antenna for each of the different RF transmitters and receivers in the STB 220, in other embodiments the various RF transmitters and receivers in the STB 220 may share one or more antennas. For example, in one embodiment, the STB 220 has a single RF antenna that all of the RF transmitters and receivers are configured to share. In such embodiments where one or more of the RF transmitters and/or receivers share a common antenna, the STB 220 may further include one or more other signal processing devices, such as multiplexers, demultiplexers, combiners, duplexers, and/or diplexers, operatively coupled to the antenna and to the transmitter and/or receiver.

In the preceding specification, various embodiments of the claimed invention have been described. It will, however, be evident that various modifications and changes may be made thereunto without departing from the broader spirit and scope of the invention as set forth in the claims that follow. The specification and drawings are accordingly to be regarded in an illustrative rather than restrictive sense.

That which is claimed:

1. A set top box apparatus comprising:
   a media content receiver to receive a media content signal provided from a service provider in a television network, the media content signal comprised of a plurality of channels;
   a first tuner to tune to a first channel, of the plurality of channels in the media content signal, to select media content of the first channel;
   a second tuner to tune to a second channel, of the plurality of channels in the media content signal, to select media content of the second channel;
   a first radio frequency transmitter operatively coupled to the first tuner and to a radio frequency antenna of the set top box, the first radio frequency transmitter to:
      convert the media content of the first channel into a first radio frequency signal in a first predefined range, of a radio spectrum, corresponding to a particular television broadcast channel, and
      transmit, via the radio frequency antenna, the first radio frequency signal for wirelessly communicating the media content of the first channel;
   a second radio frequency transmitter operatively coupled to the second tuner and the radio frequency antenna, the second radio frequency transmitter to:
      convert the media content of the second channel into a second radio frequency signal in a second predefined range, of the radio spectrum, corresponding to another particular television broadcast channel, where the first predefined range differs from the second predefined range, and
      transmit, via the radio frequency antenna, the second radio frequency signal for wirelessly communicating the media content of the second channel;
   a first radio frequency receiver to receive radio frequency signals from a first radio frequency remote control;
   a second radio frequency receiver to receive radio frequency signals from a second radio frequency remote control;
   a processing device operatively coupled to the first radio frequency receiver and the second radio frequency receiver, the processing device to distinguish between first commands received from the first radio frequency remote control and second commands received from the second radio frequency remote control, where the first commands and the second commands control the first tuner and the second tuner, respectively; and a third radio frequency transmitter operatively coupled to the processing device and the radio frequency antenna, the third radio frequency transmitter to transmit third radio frequency signals to at least one of the first radio frequency remote control or the second radio frequency remote control, where the third radio frequency signals comprise information to be displayed via a display of the at least one of the first radio frequency remote control or the second radio frequency remote control.

2. The set top box apparatus of claim 1, where the first radio frequency transmitter is to wirelessly communicate the media content of the first channel to a television.

3. The set top box apparatus of claim 1, where the first radio frequency transmitter is to transmit the first radio frequency signal to a television via the radio frequency antenna, and the second radio frequency transmitter is to transmit the second radio frequency signal to another television via the radio frequency antenna.

4. The set top box apparatus of claim 1, further comprising:
the first radio frequency remote control to control the first tuner; and
the second radio frequency remote control to control the second tuner.

5. The set top box apparatus of claim 1, further comprising:
a third tuner to tune to a third channel of the plurality of channels in the media content signal.

6. The set top box apparatus of claim 5, further comprising:
a transmitter operatively coupled to the third tuner and to transmit the media content of the third channel to a television over a wired connection.

7. The set top box apparatus of claim 1, where the third radio frequency transmitter is to transmit the third radio frequency signals comprising advertising information or program guide information to be displayed via the display of the at least one of the first radio frequency remote control or the second radio frequency remote control.

8. The set top box apparatus of claim 1, further comprising:
a transmitter to transmit data from the processing device to the service provider, where the data comprises a user selection related to at least one of pay-per-view services or video-on-demand services.

9. A method comprising:
receiving a media content signal, at a set top box, provided from a service provider in a television network, the media content signal comprised of a plurality of channels;
tuning, by a first tuner of the set top box, to a first channel, of the plurality of channels in the media content signal, to select media content of the first channel;
tuning, by a second tuner of the set top box, to a second channel, of the plurality of channels in the media content signal, to select media content of the second channel;
converting, by a first radio frequency transmitter operatively coupled to the first tuner, the media content of the first channel into a first radio frequency signal in a first predefined range, of a radio spectrum, corresponding to a particular television broadcast channel;
transmitting, via a radio frequency antenna of the set top box, the first radio frequency signal for wirelessly communicating the media content of the first channel;
converting, by a second radio frequency transmitter operatively coupled to the second tuner, the media content of the second channel into a second radio frequency signal in a second predefined range, of the radio spectrum, corresponding to another particular television broadcast channel, where the first predefined range differs from the second predefined range;
transmitting, via the radio frequency antenna, the second radio frequency signal for wirelessly communicating the media content of the second channel; and
transmitting, by a third radio frequency transmitter and via the radio frequency antenna, a third radio frequency signal to at least one of a first remote control associated with the first tuner or a second remote control associated with the second tuner.

10. The method of claim 9, where the transmitting the first radio frequency further comprises:
transmitting the first radio frequency signal to a television.

11. The method of claim 9, where the transmitting the first radio frequency signal comprises:
transmitting the first radio frequency signal to a television; and
where the transmitting the second radio frequency signal comprises:
transmitting the second radio frequency signal to another television.

12. The method of claim 9, further comprising:
receiving wireless radio frequency signals from a first remote control;
receiving wireless radio frequency signals from a second remote control; and
determining which of the plurality of channels comprise the first channel and the second channel based upon the wireless radio frequency signals received from the first and second remote controls, respectively.

13. The method of claim 9, further comprising:
receiving wireless radio frequency signals from each of a first remote control and a second remote control, the wireless radio frequency signals comprising commands; and
distinguishing between a first one of the commands received from the first remote control and second one of the commands received from the second remote control.

14. The method of claim 13, where the third radio frequency signal comprises at least one of advertising information or program guide information to be displayed via a display of the at least one of the first remote control or the second remote control.

15. The method of claim 9, further comprising:
tuning to a third channel of the plurality of channels in the media content signal.

16. The method of claim 15, further comprising:
transmitting media content of the third channel to a television over a wired connection.

17. The method of claim 9, further comprising:
receiving radio frequency signals from a radio frequency remote control; and
tuning to the first channel based at least partially on the radio frequency signals received from the radio frequency remote control.

18. The method of claim 9, where the first predefined range of the radio spectrum is between 54 megahertz to 88 megahertz.

19. The method of claim 9, where the first predefined range of the radio spectrum is between 130 megahertz to 860 megahertz.

20. The method of claim 9, further comprising:
receiving, via the radio frequency antenna, wireless radio frequency signals from a first remote control.

* * * * *